(12) United States Patent
Kumar et al.

(10) Patent No.: US 12,177,870 B2
(45) Date of Patent: Dec. 24, 2024

(54) METHODS, ELECTRONIC DEVICES AND COMPUTER-READABLE MEDIA FOR DATA BUFFER MEMORY MANAGEMENT IN WIRELESS NETWORK

(71) Applicant: Samsung Electronics Co., Ltd., Suwon-si (KR)

(72) Inventors: Rohit Kumar, Bangalore (IN); Pavan Kumar Devarayanigari, Bangalore (IN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 131 days.

(21) Appl. No.: 17/352,833

(22) Filed: Jun. 21, 2021

(65) Prior Publication Data

US 2022/0232552 A1   Jul. 21, 2022

(30) Foreign Application Priority Data

Jan. 20, 2021  (IN) .............................. 202141002816

(51) Int. Cl.
*H04W 72/51* (2023.01)
*H04L 1/1829* (2023.01)
(Continued)

(52) U.S. Cl.
CPC .......... *H04W 72/51* (2023.01); *H04L 1/1835* (2013.01); *H04W 28/0268* (2013.01); *H04W 36/22* (2013.01); *H04W 36/00838* (2023.05)

(58) Field of Classification Search
CPC . H04W 80/06; H04W 28/0268; H04W 28/26; H04W 72/04; H04W 72/048;
(Continued)

(56) References Cited

U.S. PATENT DOCUMENTS 7,711,873 B1 * 5/2010 Zaarur ................. G06F 1/3203
710/60
10,440,158 B2 * 10/2019 Leucht-Roth .......... H04L 49/90
(Continued)

FOREIGN PATENT DOCUMENTS

KR        10-0297299 B1    10/2001

OTHER PUBLICATIONS

3GPP, TS 36.322—Radio Link Protocol (RLC) specification, ETSI TS 136 322 V15.4.0 (Jul. 2020).
(Continued)

*Primary Examiner* — Peter Chen
(74) *Attorney, Agent, or Firm* — Harness, Dickey & Pierce, P.L.C.

(57) ABSTRACT

A method for data buffer memory management of an electronic device in a wireless network including storing, by processing circuitry, application data in an Application Processor (AP) buffer memory of the electronic device, determining, by the processing circuitry, a fraction of the application data from among the application data stored at the AP buffer memory based on at least one of a data rate capability of the electronic device, a data acknowledgment time or a tolerance time, and storing, by the processing circuitry, the fraction of the application data in a Communication Processor (CP) buffer memory of the electronic device for performing advanced Protocol Data Unit (PDU) formation (APF).

20 Claims, 5 Drawing Sheets

(51) Int. Cl.
*H04W 28/02* (2009.01)
*H04W 36/00* (2009.01)
*H04W 36/22* (2009.01)

(58) Field of Classification Search
CPC ......... H04W 72/0486; H04W 72/0493; H04W 8/22; H04W 36/0083; H04W 36/00837; H04W 36/0033; H04W 36/0038; H04W 36/0044; H04W 36/02; H04W 36/023; H04W 36/026; H04W 36/16; H04W 36/22; H04L 1/18; H04L 1/1835; H04L 1/1825; H04L 1/1874; H04L 1/1812; H04L 1/1816; H04L 1/1819; H04L 1/1822; H04L 49/90; H04L 49/9005; H04L 49/9042; H04L 49/9047; H04L 49/9052; H04L 49/9063
See application file for complete search history.

(56) References Cited

U.S. PATENT DOCUMENTS

2008/0101290 A1* 5/2008 Sung ............... H04L 1/1825
370/331
2020/0145881 A1* 5/2020 Mitra ............... H04W 72/1284

OTHER PUBLICATIONS

RFC: 793—Transmission Control Protocol, Darpa Internet Program Protocol Specification, Sep. 1981.
Peter Szilagyi, Csaba Vulkan, "Efficient LTE PDCP buffer management", IEEE International Conference on Communication (ICC) Jun. 2015.
3GPP, TS 36.323—Packet Data Convergence Protocol (PDCP) specification, ETSI TS 136 323 V15.6.0 (Jul. 2020).
Kamaruddin, K. "Pembangunan Suatu Model Antaramuka Kebolehkendalian-Antara Untuk Kad Pintar Di Dalam Kampus Universiti" (Apr. 2008).

* cited by examiner

METHODS, ELECTRONIC DEVICES AND COMPUTER-READABLE MEDIA FOR DATA BUFFER MEMORY MANAGEMENT IN WIRELESS NETWORK

CROSS-REFERENCE TO RELATED APPLICATION

This application claims the benefit of Indian Patent Application No. 202141002816, filed on Jan. 20, 2021, in the Indian Intellectual Property Office, the disclosure of which is incorporated herein in its entirety by reference.

TECHNICAL FIELD

The present disclosure relates to buffer memory management, and more specifically related to a method and electronic device for data buffer memory management in a wireless network.

BACKGROUND

In general, in Transmission Control Protocol (TCP), data is sent in bursts which are more likely to be held in a Packet Data Convergence Protocol (PDCP) buffer before it is transmitted over air interface and hence uses a high-capacity PDCP buffer. In contrast, real time applications e.g., Voice over Internet Protocol (VoIP), Video, etc., send data packets in regular intervals that are less likely to be held in the PDCP buffer in big amounts and, therefore, utilize smaller PDCP buffers. One use case of New Radio (NR) is dedicated to Enhanced Mobile Broadband (eMBB) for data traffic. Long-Term Evolution (LTE) Release 13 and above (LTE-A) targets a data rate of Gigabits per second (Gbps). As higher data rate brings significant processing and data management overheads; most data processing overheads, like Protocol Data Unit (PDU) formation involving sequence numbering of TCP/Internet Protocol (IP) packets at PDCP and Radio Link Control (RLC) layers, and data ciphering using configured keys, sequence numbers (SNs), etc., have been designed to be handled offline, e.g., prior to a transmission opportunity. The reasons, are 'more processing due to higher data rate', 'shorter scheduling opportunity', 'reduced symbol duration due to mmWaves in NR,' etc.

An offline or advanced PDU formation (APF) poses challenges from a buffer management point of view and could involve extra processing overhead due to data re-security at each Handover (HO) or Cell Change procedure due to security key change. The HO is a frequent phenomenon in NR and small LTE cells due to their shorter coverage area and the LTE/NR specification allows the advanced PDU formation up to half of a SN space, e.g., $2^{17}$ PDUs, which is a big number. This means either a Communication Processor (CP) system maintains a single copy of just ciphered data, recovers original data content by deciphering using an old key and re-performs ciphering with a new key; or maintain two copies of data, one plain data and second ciphered data, to avoid performing recovery of original data content prior to re-ciphering. Overall, a trade-off exists between consumption of a CP system data buffer (with respect to maintaining two copies of data) and consumption of security overhead resources (e.g., processor, power, delay, etc.) (with respect to re-performing ciphering). Another challenge with APF is due to a PDCP Discard Timer (DT). PDCP timestamps the data at arrival and discards the data if not transmitted before the DT expiry, which in turn creates a SN gap. The Network PDCP is not aware of the SN gap resulting in reordering delay and, therefore, a reduction in the overall throughput (TP). It would be desirable to achieve balance regarding APF to avoid excessive memory consumption and duplicative processing operations. Further, independent TCP and CP procedures prohibit or make difficult the sharing/usage of single copy of data. Storing a separate entire copy of complete data at CP doubles overall memory usage.

In the existing methods, two schemes 'packet pacing' and TCP 'advertised window (AWND)' management are employed for efficient PDCP buffer management. The various methods discussed under both the schemes alter the TCP control flow mechanism and attempt to minimize or reduce buffer overflow, and reduce packet drop. However, the methods are over the top (OTT) kind of schemes and do not address the base challenge of how much data memory is kept reserved for use at the CP or PDCP level. Also, these methods do not address APF.

In another existing method, almost 2× data is maintained, e.g., individual copies separately are available at TCP level and CP. In a case in which CP memory buffers are full, IP packets are dropped and a corresponding application is not aware of these drops. In addition, the CP performs APF for all the data at CP, so that the PDCP PDU management seems inefficient or non-optimal for comparatively higher TP and higher mobility scenarios. In other words, this method is non-optimal or inefficient for small Cells (LTE/NR) and in high mobility. Thus, a whole buffer management scheme involves overhauling with consideration for NR, small cells, millimeter waves and to cope up with new protocol changes.

Thus, it is desired to address the above mentioned disadvantages or other shortcomings or at least provide a useful alternative.

SUMMARY

Embodiments herein provide a method for data buffer memory management of an electronic device in a wireless network.

Embodiments provide for storage of application data at an Application Processor (AP) buffer memory of the electronic device.

Embodiments provide for determination of a fraction of application data to be stored at the Application processor (AP) buffer memory from among the application data stored at the AP buffer memory. The fraction of application data to be stored at the AP buffer memory may be computed based on at least one of a data rate capability of the electronic device and a data acknowledgment/tolerance time.

Embodiments provide for retrieving the fraction of application data from the AP buffer memory.

Embodiments provide for storing the fraction of application data in a CP buffer memory of the electronic device for advanced Protocol Data Unit (PDU) formation (APF).

Accordingly, embodiments herein provide a method for data buffer memory management of an electronic device in a wireless network. The method includes storing, by processing circuitry, application data in an Application Processor (AP) buffer memory of the electronic device, determining, by the processing circuitry, a fraction of the application data from among the application data stored at the AP buffer memory based on at least one of a data rate capability of the electronic device, a data acknowledgment time or a tolerance time, and storing, by the processing circuitry, the fraction of the application data in a Communication Processor (CP) buffer memory of the electronic device for performing advanced Protocol Data Unit (PDU) formation (APF).

Accordingly, embodiments herein provide an electronic device for data buffer memory management in a wireless network. The electronic device includes an Application Processor (AP) buffer memory, a Communication Processor (CP) buffer memory, and processing circuitry configured to store application data at the AP buffer memory, determine a fraction of the application data, from among the application data stored at the AP buffer memory based on at least one of a data rate capability of the electronic device or a data acknowledgment time, and store the fraction of the application data in the CP buffer memory for performing an advanced Protocol Data Unit (PDU) formation (APF).

Embodiments herein provide a non-transitory computer-readable medium storing instructions that, when executed by processing circuitry cause the processing circuitry to perform a method for data buffer memory management of an electronic device in a wireless network. The method includes storing application data in an Application Processor (AP) buffer memory of the electronic device, determining a fraction of the application data from among the application data stored at the AP buffer memory based on at least one of a data rate capability of the electronic device, a data acknowledgment time or a tolerance time, and storing the fraction of the application data in a CP buffer memory of the electronic device for performing advanced Protocol Data Unit (PDU) formation (APF).

These and other aspects of embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of embodiments herein without departing from the spirit thereof, and embodiments herein include all such modifications.

DESCRIPTION OF THE DRAWINGS

Embodiments are illustrated in the accompanying drawings, throughout which like reference letters indicate corresponding parts in the various figures. Embodiments herein will be better understood from the following description with reference to the drawings, in which.

DETAILED DESCRIPTION

Figure 1:
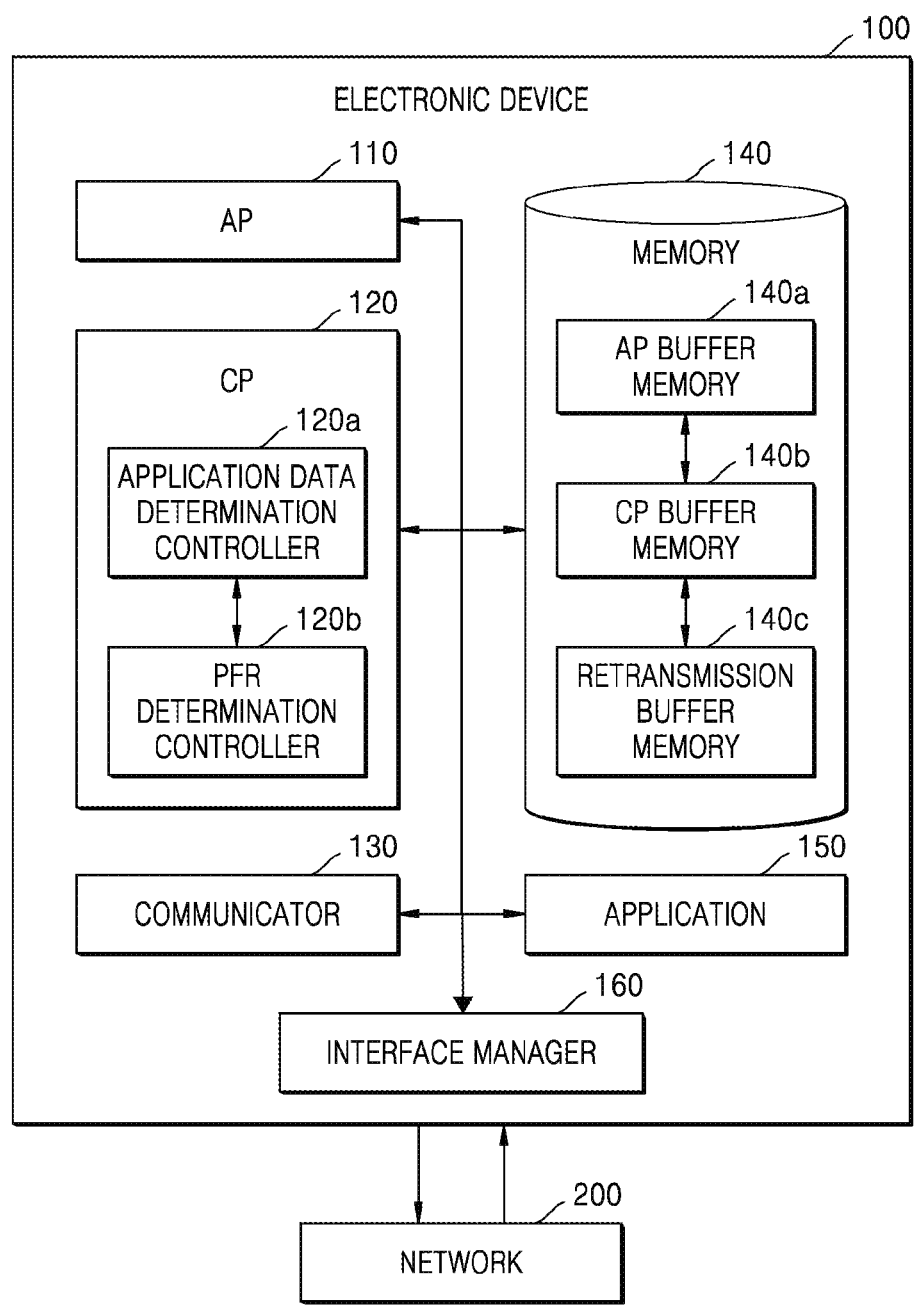
FIG. 1 shows various hardware components of an electronic device for data buffer memory management in a wireless network, according to embodiments as disclosed herein.

Embodiments herein and the various features and advantageous details thereof are explained more fully with reference to embodiments that are illustrated in the accompanying drawings and detailed in the following description. Descriptions of well-known components and processing techniques are omitted so as to not obscure embodiments herein. Also, embodiments described herein are not mutually exclusive, as embodiments may be combined. The term "or" as used herein, refers to a non-exclusive or, unless otherwise indicated. The examples used herein are intended merely to facilitate an understanding of ways in which embodiments herein may be practiced and to further enable those skilled in the art to practice embodiments herein. Accordingly, the examples should not be construed as limiting the scope of embodiments herein.

As is traditional in the field, embodiments may be described and illustrated in terms of blocks which carry out a described function or functions. These blocks, which may be referred to herein as units or modules or the like, may be physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block may be physically separated into two or more interacting and discrete blocks without departing from the scope of embodiments. Likewise, the blocks may be physically combined into more complex blocks without departing from the scope of embodiments.

The accompanying drawings are used to help easily understand various technical features and it should be understood that embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

The terms "TCP buffer" and "AP buffer" may be used interchangeably in the patent disclosure.

Accordingly, embodiments herein provide a method for data buffer memory management of an electronic device in a wireless network. The method includes receiving a plurality of application data by a Communication Processor (CP) of the electronic device. Further, the method includes storing, the plurality of application data at an Application Processor (AP) buffer memory of the electronic device. Further, the method includes determining, by the CP, a fraction 'F' of application data to be stored at the CP from the plurality of application data stored at the AP buffer memory. The fraction of application data to be stored at the CP may be computed based on at least one of a data rate capability of the electronic device and a data acknowledgment/tolerance time whichever is minimum (e.g., less). Further, the method includes retrieving the fraction of application data from the AP buffer memory by the CP. Further, the method includes storing the fraction of application data in a CP buffer memory of the electronic device for advanced Protocol Data Unit (PDU) formation (APF) by the CP.

Unlike conventional methods, in embodiments, the buffer management for computing CP memory is shared for the electronic device generated or UL data in wireless network with efficient AP/CP communication. The proposed method may be expanded for downlink path. The method may be used for data buffer memory management of the electronic device in the wireless network in an efficient manner. The method may be used to effectively minimize or reduce data buffer storage consumption as well as reduce data processing interlinked.

The method may be used to reduce a double overhead and perform Advance PDU formation at the CP level in accordance with a wireless protocol. The method may be used to manage a buffer size between AP and modem without impacting data performance.

The method may be used to maintain a retransmission buffer where the size of retransmission buffer is "F/K", K is a natural number and F is fraction of total application data. The method may be used to retain a fraction 'f' of total "F" based on an electronic device computed negative-acknowledgement (NACK) rate and possible data could end up in retransmission. The electronic device may compute a NACK rate based on a MAC HARQ error and HARQ residual error, SINR, etc. In embodiments, the Advance PDU formation may be used to reduce the processing overhead due to security at frequent HO. The method may be used to save the power of the battery of the electronic device and reduce processing overhead in the electronic device.

The method may be adopted into a NR chipset and/or for LTE memory management.

Referring now to the drawings, and more particularly to FIGS. 1 through 5, where similar reference characters denote corresponding features consistently throughout the figures, there are shown embodiments.

FIG. 1 shows various hardware components of an electronic device (100) for data buffer memory management in a wireless network (200), according to embodiments as disclosed herein. The electronic device (100) may be, for example, but is not limited to a cellular phone, a smart phone, a Personal Digital Assistant (PDA), a wireless modem, a tablet computer, a laptop computer, an Internet of Things (IoT), a smart watch, a virtual reality device or the like. In embodiments, the wireless network (200) may also refer to, connect with and/or include another electronic device and/or a base station.

The base station may generally refer to a fixed station that communicates with user equipment and/or other base stations, and may exchange data and control information by communicating with user equipment and/or other base stations. For example, the base station may also be referred to as a Node B, an evolved-Node B (eNB), a next generation Node B (gNB), a sector, a site, a base transceiver system (BTS), an access point (AP), a relay node, a remote radio head (RRH), a radio unit (RU), a small cell, or the like. In the present specification, a base station or a cell may be interpreted in a comprehensive sense to indicate some area or function covered by a base station controller (BSC) in CDMA, a Node-B in WCDMA, an eNB in LTE, a gNB or sector (site) in 5G, and the like, and may cover all the various coverage areas such as megacell, macrocell, microcell, picocell, femtocell and relay node, RRH, RU, and small cell communication range.

The wireless network (200) between the electronic device (100) and the base station (and/or other electronic device) may support communication between multiple users by sharing available network resources. For example, in the wireless network (200), information may be transmitted in various multiple access schemes, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), OFDM-FDMA, OFDM-TDMA, and OFDM-CDMA.

In embodiments, the electronic device (100) may include an AP (110), a CP (120), a communicator (130), a memory (140), and/or an application (150). The memory (140) may include an AP buffer memory (140a), a CP buffer memory (140b), and/or a retransmission buffer memory (140c). The CP (120) may include an application data determination controller (120a) and/or a PFR determination controller (120b). The CP (120) may be provided with the AP (110), the communicator (130), the memory (140), and/or the application (150). According to embodiments, the AP buffer memory (140a) may also be referred to herein as the TCP buffer memory. According to embodiments, the memory (140), the AP buffer memory (140a), the CP buffer memory (140b) and/or the retransmission buffer memory (140c) may be implemented using one or more volatile memory devices, such as Random Access Memory (RAM), Dynamic RAM (DRAM) and/or Static RAM (SRAM), etc. In embodiments, the memory (140), the AP buffer memory (140a), the CP buffer memory (140b) and/or the retransmission buffer memory (140c) may be implemented using one or more non-volatile memory devices, such as flash memory, Electrically Erasable Programmable Read-only Memory (EEPROM), Magnetic RAM (MRAM), Phase-change RAM (PRAM), and/or Resistive RAM (RRAM), etc. According to embodiments, the retransmission buffer memory (140c) may be included in the CP buffer memory (140b). According to embodiments, the retransmission buffer memory (140c) may be shared memory between the AP (110) and the CP (120). According to embodiments, the retransmission buffer memory (140c) may be shared memory configured to be accessed by both the AP (110) and the CP (120).

The communicator (130) may be configured for communicating internally between internal hardware components and with external devices via one or more networks.

The CP (120) may be configured to receive application data. The application data may be received from the application (150). The application (150) may be, for example, but not limited to, a game application, a finance application, a social network application, a chat application or the like. Further, the CP (120) may be configured to store the application data at the AP buffer memory (140a). Based on the application data stored at the AP buffer memory (140a), the CP (120) may be configured to determine a fraction of the application data (e.g., a portion, a subset, etc. of the application data) to be stored at the AP buffer memory (140a) and/or the CP buffer memory (140b) using the application data determination controller (120a). The fraction of the application data to be stored at the AP buffer memory (140a) and/or the CP buffer memory (140b) may be computed based on at least one of a data rate capability of the electronic device (100), a data acknowledgment time and/or tolerance time (e.g., whichever time is minimum or less). The data acknowledgement time or the data tolerance time may indicate that old data may be replaced with new data from the AP buffer memory (140a) or freed from the CP buffer memory (140b). According to embodiments, the application (150) may be implemented as software instructions stored in a memory on the electronic device (100) (e.g., the memory (140)) and executed by at least one processor (e.g., the AP (110) and/or the CP (120)).

The data rate capability may represent capability information about the electronic device (100). In an example, the data rate capability may indicate whether the electronic device (100) is Carrier Aggregation (CA) supported, EUTRA NR Dual Connectivity (ENDC) Supported, 256 QAM supported, etc. If the electronic device is CA supported, the data rate capability information may indicate how many component carriers (CCs) are supportable using the CA, etc. Further, depending on these capabilities, the maximum data rate, or upper limit data rate, supported by the electronic device (100) may be estimated.

Further, the data acknowledgement time may represent an amount of time it takes for a protocol PDU to get acknowledged at a radio link control (RLC) level (e.g., receiving an RLC ACK). Since at receiving RLC ACK only the data is freed. The data tolerance time may be defined as the maximum, or upper limit amount of, time it takes for the CP buffer memory (140b) to run out of space for new data storage when the RLC ACK is deprived (e.g., not received). That means, a receiver of the electronic device (100) may acknowledge the data (e.g., indicate reception of the RLC ACK) to a transmitter of the electronic device (100) so that the transmitter may free up the data and make space for new data. However, in order to account for circumstances in which the receiver of the electronic device (100) does not acknowledge the data to the transmitter, techniques for buffer management may consider the tolerance time and permit buffer space to be utilized for new data despite the absence of the RLC ACK. However, in the event the RLC ACK is received corresponding to data previously cleared (e.g., overwritten) in the CP buffer memory (140b), the electronic device (100) may retrieve the previously cleared data from the AP space via existing techniques. As in the proposed method, the method may be used to maintain CP descriptor info for an AP buffer pointer to retrieve the data via an interface manager (160) included in, and/or implemented using, the electronic device (100). The interface manager (160) may represent an interface between AP and CP for buffer management.

Further, the CP (120) may be configured to retrieve the fraction of the application data from the AP buffer memory (140a). Further, the CP (120) may be configured to store the fraction of the application data in the CP buffer memory (140b) for use in performing an advance Protocol Data Unit (PDU) formation (APF).

Further, the CP (120) may be configured to determine a PDU formation rate (PFR) based on a plurality of parameters using the PFR determination controller (120b). The plurality of parameters may include, for example, but are not limited to an Initial PFR (IPFR), a Grant rate, a PDU Error rate (PER), a quality of service (QoS) parameter, and/or a condition of the wireless network (200).

In embodiments, the IPFR may be computed for a Data Radio Bearer (DRB) based on at least one of a PFR of another active DRB multiplied by a factor 'IPFR of the DRB to an IPFR of other active DRB', a weighted IPFR average of all active DRBs, and/or a populated table for the IPFR. The populated table may be a table prepared through learning of downlink data rates. The table may be static or dynamic in nature; e.g., may be periodically or aperiodically updated based on learning of network scheduling. In embodiments, the grant rate may be computed based on a latest network resource allocation over a period of time. In embodiments, the grant rate may be computed as a quantity of resource allocation grants within the period of time.

An example to illustrate the determination of the PFR is as follows. Consider, the Packet Error Rate (PER)=20%, Grant Rate=8 Mbps (Sum of Grants averaged for last K Transmission Time Interval (TTI)/Slot, say 50 ms, where TTI or Slot is Spec/Protocol defined smallest scheduling opportunity for the configuration), and IPFR (Initial Packet Formation Rate)=4 Mbps (where IPFR=maximum, or highest, of Guaranteed Bit Rate (GBR), Aggregate Maximum Bit Rate (AMBR), and PBR, or based on populated IPFR table for the network, maximum, or highest, allocation resource for one scheduling opportunity, etc.). In accordance with the above conditions, the PFR may be calculated as follows:

$X$=MAX (AMBR, PBR, GBR)=4 Mbps, wherein $X$ is the maximum, or highest, of AMBR, GBR or PBR.

PFR=IPFR*(GRANT_RATE)/$X$*(100−PER)/100

(4 Mbps)*(8 Mbps/4 Mbps)*((100−20)/100)=>(4 Mbps)*(2)*(4/5)=>8/5=(32/5 Mbps)=6.4 Mbps As the electronic device is able to determine the PFR as 6/4 Mbps if the IPFR is initialised at 4 Mbps, the Grant Rate is 8 Mbps and the PER is 20%. The PFR mathematical expression described above is just an example and embodiments are not limited thereto. The other expression could look similar to ((GRANT_RATE*(100−PER))/100). IPFR initial value is also maximum, or highest, of AMBR, GBR or PBR.

In embodiments, the AMBR, GBR or PBR consideration may be adjusted using the application defined QoS parameters. For example, in a situation in which a service is expected to provide a particular data rate that is not consistent with the configured PBR/AMBR/GBR value. These values represent a minimum, or lowest level, quality support from the network. The network may allocate more as indicated in the example above, e.g., X is 4 Mbps whereas Grant rate is 8 Mbps. Further, on a similar line, the PER may be replaced with another component corresponding to Signal Quality (e.g., Received Signal Received Power (RSRP), Received Signal Received Quality (RSRQ), Signal-to-Interference-plus-Noise Ratio (SINR), etc.).

Further, an initial value of IPFR for new RB as in above example could be set to X or it may be computed using several other techniques such as those indicated below:
a) If other RB is active and ongoing data, then IPFR of new RB may be computed using other active RB information like=>[(X)*(grant_rate_alloc_OtherRB/pbr_otherRB)*(1−bier/100)];
b) If other RB is not active and not ongoing data, then an already populated table for packet formation built up on PBR, GRANT, Block Error Rate (BLER), RSRP/RSRQ/SINR, etc., may be used to get the initial value. As in operation (a) the value of IPFR may be stored in a table and may be used later. So here the data present in this table could actually be the signal quality (RSRP/RSRQ/SINR), PHR (power headroom report), Grant rate, Packet error rate, etc. Or it could be Packet Formation rate at different signal quality; and/or
c) if more than one RB is active and ongoing data, then IPFR of new RB may be computed using other active RB information using averaged weighted method as follows: [[(X)*(grant_rate_alloc_RB1/pbr_RB1)*(1−bler/100)]+[(X)*(grant_rate_alloc_RB2/pbr_RB2)*(1−bler/100)] . . . +[(X)*(grant_rate_alloc_RB_N/pbr_RB_N)*(1−bler/100)]]/N; where N is the number of active RBs. According to embodiments, RB and DRB may be used interchangeably herein.

Based on the fraction of the application data stored at the CP buffer memory (140b) and the determined PFR, the CP (120) may be configured to determine an amount and/or portion of the application data to be ciphered from among the fraction of the application data stored at the CP buffer memory (140b). Further, the CP (120) may be configured to form at least one PDU for transmission by ciphering the determined amount and/or portion of application data from among the fraction of the application data. Further, the CP (120) may be configured to transmit at least one packet comprising the at least one formed PDU in the wireless network (200) (e.g., to another electronic device, base station, etc., in the wireless network (200)).

In embodiments, the CP (120) may be configured to determine whether at least one acknowledgement is received for the at least one transmitted packet from the wireless network (200). In response to determining that the at least one acknowledgement is received for the at least one transmitted packet from the wireless network (200), the CP (120) may be configured to replace the fraction of the application data stored at the AP buffer memory (140a) and/or the CP buffer memory (140b) with a new fraction of the application data. According to embodiments, the CP (120) may determine the new fraction of the application data based on at least one of the data rate capability of the electronic device (100), and/or the data acknowledgment time or tolerance time. In response to determining that the at least one acknowledgement is not received (e.g., in response to determining a failure to receive the at least one acknowledgement) for the at least one transmitted packet from the wireless network (200), the CP (120) may be configured to replace the old data 'F' from the fraction of the application data stored at the AP buffer memory (140a). In addition, while doing so maintain the old data at CP buffer memory (140b) into a retransmission buffer memory (140c) whose acknowledgment is not received.

In embodiments, the CP (120) may be configured to determine that in absence of an acknowledgement about the state of UL packet reception at the wireless network (200), at expiry of a data tolerance time or when a CP buffer for transmission (e.g., a capacity of the CP buffer memory (140b)) reaches a threshold, the CP (120) may be configured to replace the fraction of the application data stored at the CP buffer memory (140b) with a new fraction of the application data from the AP buffer memory (140a). While doing so, e.g., the replenishing the CP buffer memory (140b) with new data, the CP (120) may determine that the at least one acknowledgement may not be received for the at least one transmitted packet from the wireless network (200). In such a case, the CP (120) may be configured to move the subset of the application data from the fraction of the application data stored at the CP buffer memory (140b) into a retransmission buffer memory (140c). According to embodiments, moving the subset of the application data may include storing the subset of the application data in the retransmission buffer memory (140c) and/or replacing the subset of the application data with the new fraction of the application data in the CP buffer memory (140b).

In embodiments, the subset of the application data to be moved from the fraction of application data stored at the CP buffer memory (140b) may be computed based on at least one of a Medium Access Control (MAC) Hybrid Automatic Repeat Request (HARQ) error, a HARQ residual error and/or a previous Radio Link Control (RLC) Automatic Repeat Request (ARQ) error. According to embodiments, the MAC HARQ error, the HARQ residual error and/or the previous RLC ARQ error may refer to a MAC HARQ error rate, the HARQ residual error rate and/or the previous RLC ARQ error rate.

Further, the CP (120) may be configured to detect at least one of a first condition in which a count of formed PDUs meets an APF threshold, a second condition in which a frequency of HOs meets a frequency HO threshold, and/or a third condition in which a number of packet discards meets an Uplink (UL) packet discard threshold. Further, the CP (120) may be configured to re-determine the PFR for the PDU formation based on at least one of the count of the formed PDU's, the frequency of HO and/or the number of packet discards. According to embodiments, the CP (120) may be configured to repeat the determining of the PFR (e.g., according to an Initial PFR (IPFR), a grant rate, a PDU Error rate (PER), a quality of service (QoS) parameter, and/or a condition of the wireless network (200)) based on the at least one of the first condition, the second condition and/or the third condition.

The advance packet formation threshold may be defined as a threshold number of processed packets ready for transmission at any point of time. In certain situations, the network could allocate more or maximum resources at any or some scheduling opportunity and at this point in time the electronic device (100) should have sufficient processed packets for transmission (e.g., by maintaining a number of processed packets higher than the APF threshold). Therefore, the network allocation does not get wasted.

In the electronic device, there may be several tasks running and therefore the electronic device (100) does not have access to sufficient resources to prepare processed data at every single scheduling opportunity. It is desirable to keep processed packets available for higher TP connections due to the extensive processing used for large amounts of data. Thus, the techniques should strike a balance with regards to the amount of processed packets to store. The following examples illustrate factors that may be considered in striking that balance.

Factor 1) APF threshold—The electronic device (100) UE should keep some packets readymade for transmission up to K scheduling opportunity considering max, or upper limit, allocation from network. Here K>=1.

Factor 2) HO frequency—At HO, security key changes and therefore data is reprocessed for ciphering with new key. Compression may change as well. And hence data recompression is performed. Therefore a UE should keep balanced amount of data in processed state so that it may avoid or reduce re-computation of the entire data for security, compression, etc.

Factor 3) Number of packet discards meeting a packet discard threshold: Packet discard happens in absence of resource allocation from the network. When processed packets are discarded, CPU usage to process the data is wasted. Accordingly, it may be useful to set (e.g., reduce) the PFR based on a number of packet discards to avoid discard of processed data.

Although the FIG. 1 shows various hardware components of the electronic device (100), it is to be understood that embodiments are not limited thereon. In embodiments, the electronic device (100) may include less or more components. Further, the labels or names of the components are used only for illustrative purposes and do not limit the scope of embodiments. One or more components may be combined together to perform the same or a substantially similar function for data buffer memory management of the electronic device (100) in the wireless network (200).

Figure 2:
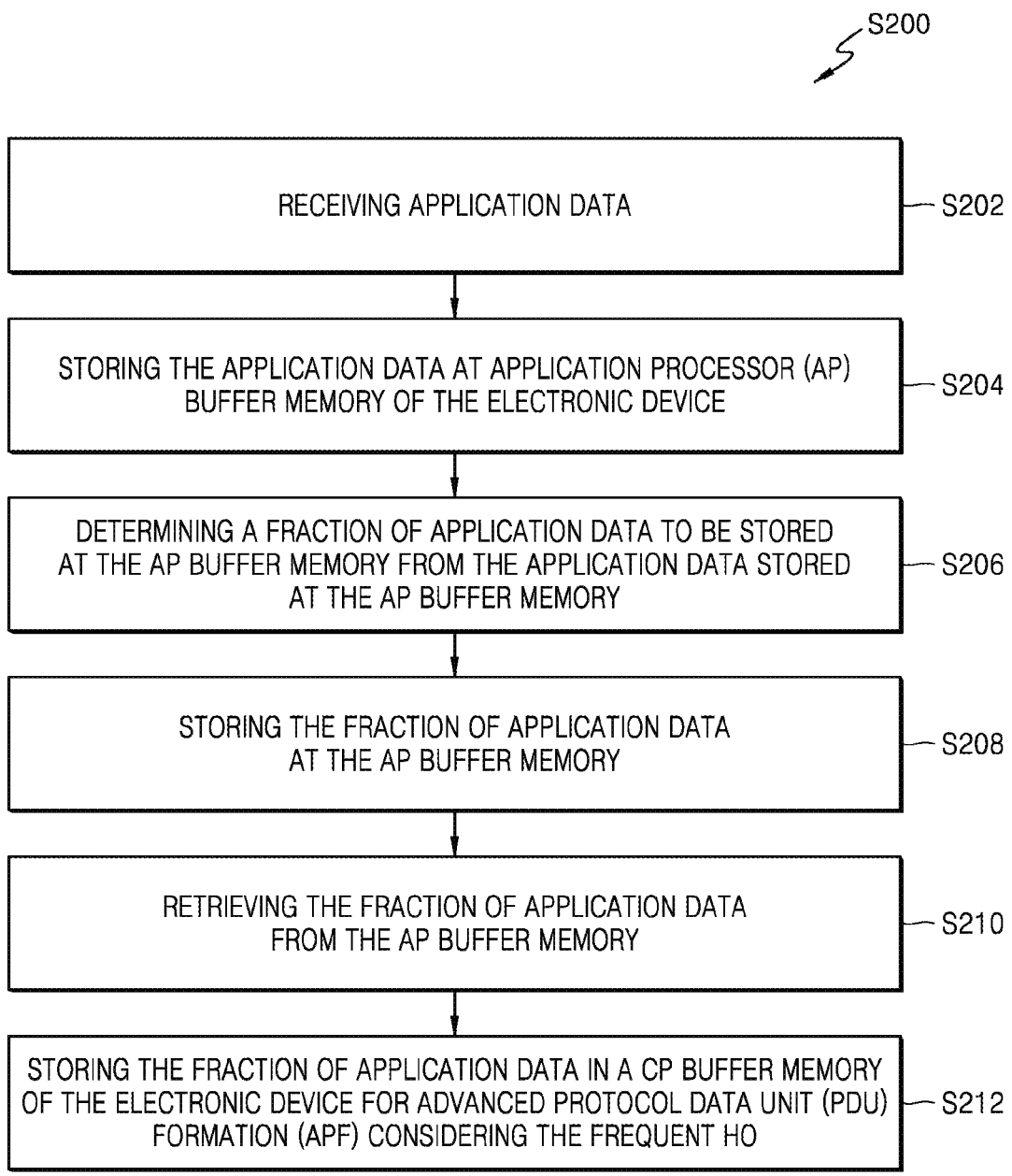
FIG. 2 is a flow diagram illustrating a method for data buffer memory management of the electronic device in the wireless network, according to embodiments as disclosed herein.

FIG. 2 is a flow diagram (S200) illustrating a method for data buffer memory management of the electronic device (100) in the wireless network (200), according to embodiments as disclosed herein. The operations (S202-S212) may be performed by the CP (120). At S202, the method may include receiving the application data. At S204, the method may include storing the application data at the AP buffer memory (140a). The application data which is stored at the AP buffer memory (140a) of the electronic device (100) may be managed by TCP/UDP/IP Protocol depending on a traffic class. This means that any data which is brought at the CP buffer may also be present at the AP buffer. The CP buffer region may be controlled using protocol of the specific Radio Access Technology (RAT), whereas the AP buffer region may be controlled by the TCP/IP protocol. In an example, any data which is brought at the CP buffer is freed at CP (at receiving RLC ACK) could still be present at the AP buffer if TCP ACK is not yet received and the traffic class is TCP. At S206, the method may include determining the fraction of the application data to be stored at the AP buffer memory (140a) from among the application data stored at the AP buffer memory (140a). At S208, the method may include storing the fraction of the application data at the AP buffer memory (140a). At S210, the method may include retrieving the fraction of the application data from the AP buffer memory (140a). At S212, the method may include storing the fraction of the application data in the CP buffer memory (140b) for advanced Protocol Data Unit (PDU) formation (APF) considering frequent handover.

Figure 3:
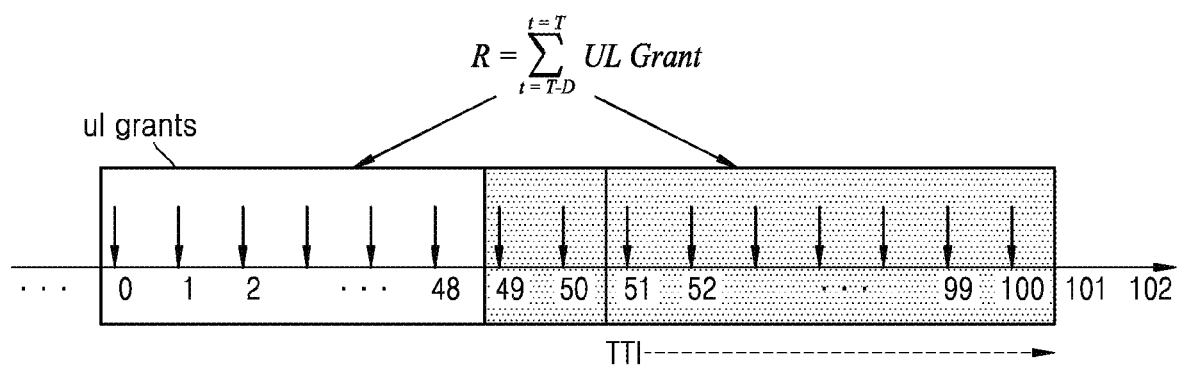
FIG. 3 is an example illustration in which a fixed/dynamic grant rate computation is depicted, according to embodiments as disclosed herein.
Figure 5:
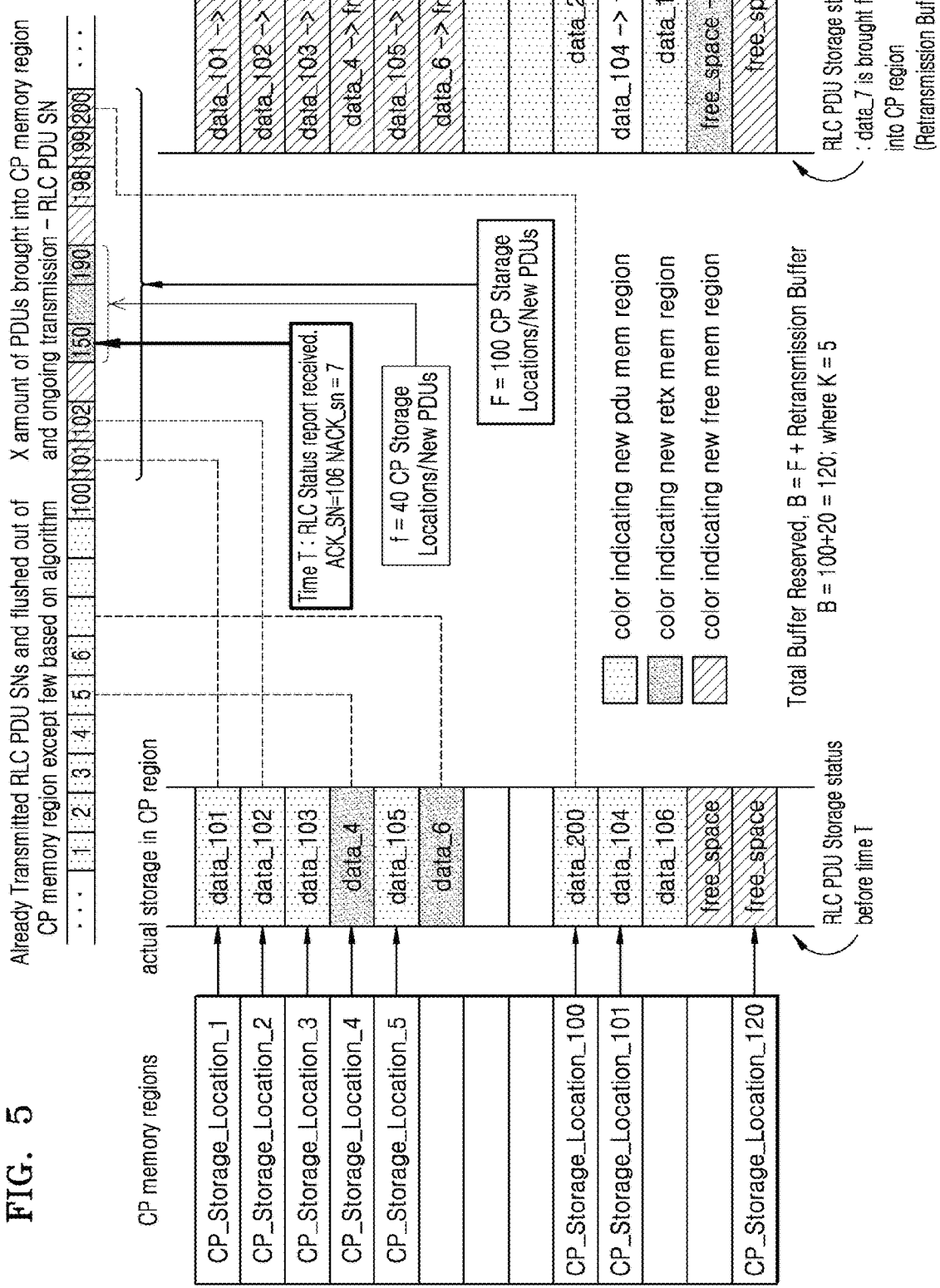
FIG. 5 depicts about maintaining 'F' and 'f' respectively in the CP buffer, according to embodiments as disclosed herein.

FIG. 3 is an example illustration in which a fixed/dynamic grant rate computation is depicted, according to embodiments as disclosed herein. The wireless network (200) may allocate uplink resources based on several criteria including network load, quality of service, channel state, signal quality, power headroom, etc. These uplink resources may be referred to as an uplink grant. The electronic device (100) may derive (e.g., determine) the averaged grant rate based on the criteria over a period. Referring to FIG. 5, the computation uplink grant rate dynamically is depicted in which UL grants have been averaged for the last X ms and R denotes the UL Grant rate. Shaded color is being used to show how the Grant window, over which average is to be computed, is shifting across time. As the time progresses, the latest updated window may be used to compute the UL grant rate.

Figure 4:
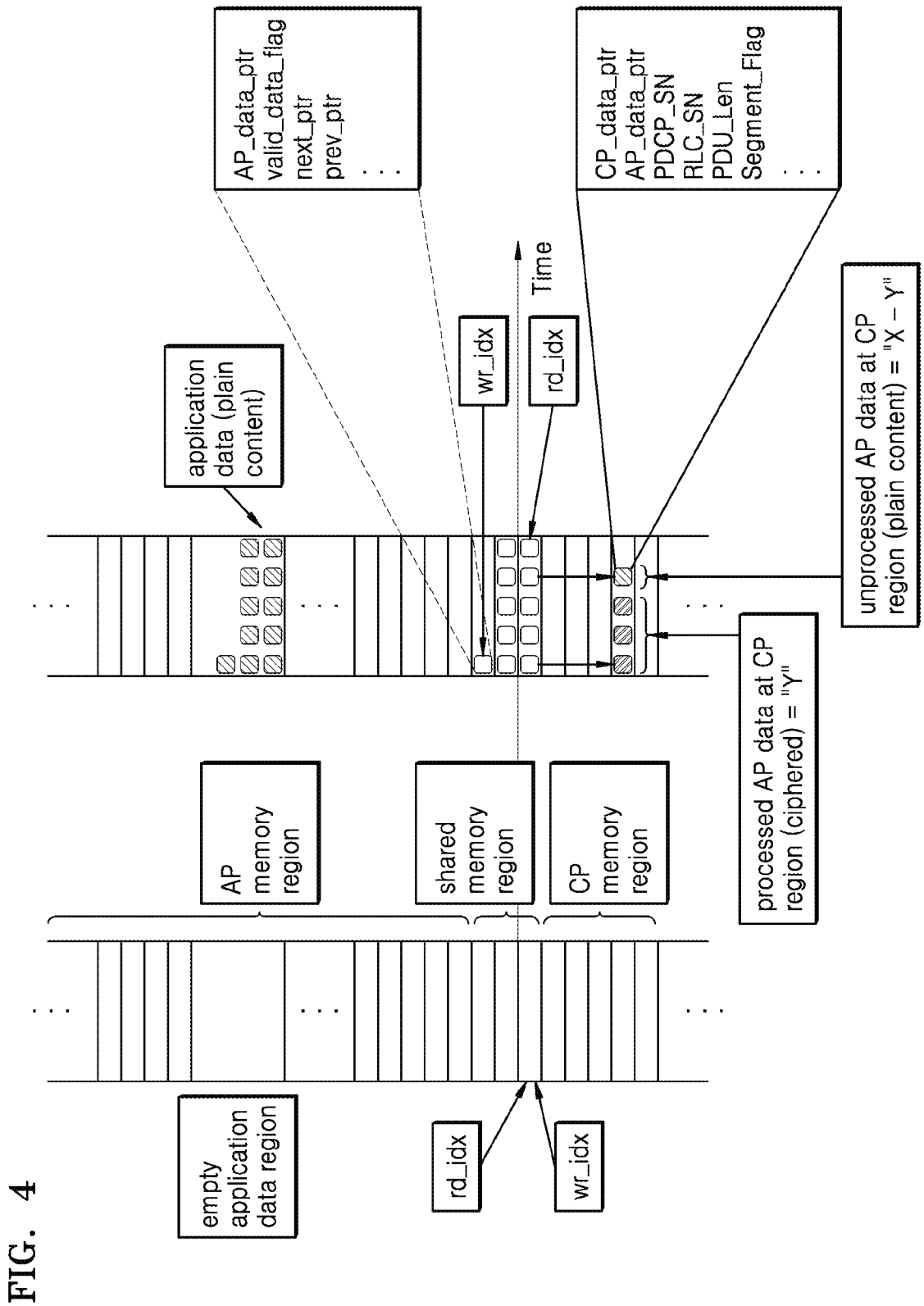
FIG. 4 is an example illustration in which memory buffers and layout for TCP, CP and shared usage are depicted, according to embodiments as disclosed herein.

FIG. 4 is an example illustration in which memory buffers and layout for TCP, CP and shared usage are depicted, according to embodiments as disclosed herein. The shared memory region may contain metadata for the application data. The metadata may include fields related to the 'memory location of the data stored at AP buffer region', 'amount of data forwarded from AP buffer region into the CP buffer region for further transmission e.g., rd_idx', 'end of application data buffer e.g., wr_idx', etc. The CP may also manage the application data in a CP buffer region e.g., length of the data, Protocol state variables like Sequence number, memory pointer of the data stored in CP buffer region, memory pointer of the data stored in AP buffer region, etc. This metadata may be used for smooth handling of the data during first transmission/retransmission as well as during a buffer replacement procedure from AP region to CP region.

Referring to the FIG. 4, it is to be noted that application generates a packet and it is stored at the AP buffer. This data is to be transmitted, via underlying RAT (e.g., 4G or 5G), to the destination server/IP. An interface manager (160) determine which packets are forwarded to the CP for transmission and which are reserved. This interface manager (160) may manage the shared memory region. According to embodiments data duplication may not be performed; rather the shared memory region may contain a table or array of meta-data for each individual application data or TCP packet. Here, the metadata includes the fields related to the memory location of the data stored at AP buffer region, the amount of data forwarded from AP buffer region into the CP buffer region for further transmission e.g., 'rd_idx', end of application data buffer e.g., 'wr_idx', etc.

When data is forwarded to the CP region a mem-copy of the data from the AP buffer to the CP buffer is performed. The interface manager (160) may track this info using read and write index; e.g., read/write index point to table of meta-data where data belonging up to location marked by rd_idx has been forwarded to CP for transmission whereas data between read to write index is yet to be transmitted to CP region. The CP may also manage the application data in the CP buffer region, e.g., length of the data, Protocol state variables like Sequence number, memory pointer of the data stored in CP buffer region, memory pointer of the data stored in AP buffer region, etc. These metadata may be used for smooth handling of the data during first transmission/retransmission as well as during buffer replacement procedure from the AP region to the CP region.

In other words, the interface manager (160) may manage a table of meta-data where entry is stored for each individual application data/packet. The interface manager (160) may delete the meta-data entry only when the Application or TCP frees the buffer. Entire application data may be maintained at the AP Buffer region. It is to be generally noted that the CP buffer region may be substantially smaller than the AP buffer region. Therefore, at any point of time, the CP just holds some fraction of the entire application data, or the complete AP buffer data if it fits in the space.

The CP Buffer region is actually a collection of multiple CP storage locations where the data is mem-copied once brought to the CP region from the AP region. However, for each piece of data, protocol level information and other essential information (e.g., meta-data about the piece of data, and protocol information like individual data level information, such as data length of each piece of Data, CP region memory location, AP region memory location, Packet Data Convergence Protocol (PDCP) Sequence number (SN), RLC SN, etc.), CP buffer Descriptor information is maintained. Therefore, there is a table of CP Descriptor information maintained at CP level. In summary, the CP Buffer region may perform storage of Data and the CP descriptor table element may be one to one mapped to the Data. The CP Descriptor table may be a different memory which may be significantly smaller than the CP region. The size of the CP Descriptor table may be up to half of the PDCP and/or RLC SN Reordering Window, and could be shared across multiple active bearers. In an estimate, since this size is 20 Byte per 1500 Byte Data, we may consider that 1.5% of CP region may be attributed to CP Descriptor table storage.

In the timeline—at time T=0, Memory may be divided in different regions for storing different information. Over time, Data is being generated at an application, entry is marked by the interface manager (160) in the meta-data table and a write index accordingly updated. Once the data is forwarded to the CP, a read index is updated. The CP frees the CP buffer region according to embodiments. The AP frees the AP buffer region based on the TCP ACK reception from the peer TCP receiver.

Data at the CP Buffer region is divided into 2 sub regions that is processed data and unprocessed data. Here processed data means that the data (which has been brought from the application buffer via the interface manager (160)) has undergone the CP RAT protocol related operations that include PDCP and/or RLC Header generation, Robust Header Compression (ROHC)/Uplink Data Compression (UDC) compression, PDCP encryption, etc., and the rest is called unprocessed data.

FIG. 5 depicts an example of maintaining 'F' and 'f' respectively in the CP buffer, according to embodiments as disclosed herein. As shown in FIG. 5, a portion of the application data "F" presently resides in the CP buffer region and out of which a section of it, 'f' is depicted as processed recently in advance prior to transmission as per APF. Overall, from data_101 to data_190 is processed data, and data_191 to data_200 is unprocessed, at Time T. Data_150 to data_190 is recently processed data as per the APF algorithm. This (old) buffer 'F' at CP region is replaced with (new) 'F' from AP buffer region at an interval, where this interval could be periodic/aperiodic or based on threshold buffer (e.g., a CP buffer memory (140b) capacity threshold). Further, it is proportional to the averaged Acknowledgement Time or packet tolerance time in CP region whichever is minimum or less. By a threshold buffer, it is meant that almost all of the CP buffer memory (140b) is consumed. Here, 'F' represents the amount of buffer brought from AP region to CP region; whereas 'f' represents the processed buffer out of total 'F' ready for transmission. At the CP (120), based on a perceived Block Error Rate (BLER), some data from (old) F is maintained at the CP (120) so as to facilitate possible retransmission in case of NACK.

Overall as shown in FIG. 4 and FIG. 5, the proposed method utilizes the concept of virtual memory as defined in an operating system (OS). That is, application data already being managed at TCP level is considered as secondary storage by the CP (120), and may not to be stored completely at the CP (120). Instead, a fraction of data, 'F', is brought to the CP (120) (as in primary memory) for processing before transmission. This 'F' comprises new data and is called the transmission buffer. The method computes 'F' based on a peak electronic device data rate capability and/or an averaged acknowledgment time 'T' because a data life time in CP is defined by RLC Acknowledgment (ACK). Ideally, an old 'F' is replaced by new 'F' (from TCP buffer) at reception of ACKs. In the absence of ACKs, the method may be used to replace old "F" data with new 'F'. A fraction of data, 'r', out of 'F' is kept in the retransmission buffer, 'R'. Here, 'r' may be the number of PDUs which are perceived to have not reached the receiver side. In FIG. 5, data_4, data_6 and data_7 comprise 'r'. The UE may determine 'r' from MAC HARQ error, HARQ residual error and/or RLC Status report; whereas 'R' may be the maximum, or upper limit, retransmission buffer space reserved for keeping 'r' number of old 'F' PDUs that may be in RLC retransmission. 'R' is $\frac{1}{K}$ th part of total 'F'. This helps in avoiding or reducing extra processing from bringing the data from TCP buffer to CP buffer memory (140b) for retransmission. A memory buffer parameter, B, may be a sum of 'F' and 'R' and may be computed as below equations (1-4):

$$T = func(x, y, z, w) \tag{1}$$

$$F = T \times \text{peak\_data\_rate\_capability} \tag{2}$$

$$f = func(ARQ \text{ error}, HARQ \text{ (residual) error}) \tag{3}$$

$$R = F \times \frac{1}{R}; \text{ Where } K \text{ is a Natural number} \tag{4}$$

where, 'x' denotes poll retransmit time, 'y' denotes POLL BYTE and 'z' denotes poll PDU, 'w' is a user configured value derived peak data rate capacity, data processing time (processing overhead plus security). According to embodiments, the OS may be stored and/or installed in a memory on the electronic device (100) (e.g., the memory (140)) and executed by at least one processor (e.g., the AP (110) and/or the CP (120)).

The memory buffer parameter B may be the actual size of the CP data region; which is the sum of a new data region and a retransmission (RETX) Data region. The memory buffer parameter B may be computed based on, 'x', 'y' and 'z' which are Protocol defined parameters that define inputs for RLC Status report trigger. That is, 'x' denotes poll retransmit time, 'y' denotes POLL BYTE and 'z' denotes poll PDU, as described in the RLC (LTE 3GPP 36322, NR 3GPP 38322) specification. RLC Status report request may be useful because, on receiving RLC ACK, only the buffer is freed from CP buffer region.

The factor 'w' may represent the device capability factor. Several RLC PDU may be transmitted via multiple paths (CA or Dual Connectivity (DC)) at the same time or contemporaneously. Moreover, there are multiple variants of devices which have different hardware capabilities, CPU Clock frequencies, etc. (e.g., corresponding to price range). Therefore, consideration should be given to both (a) the memory requirements or specifications for multi carrier supporting devices where the memory requirements or specifications should be higher than the memory requirements or specifications for single carrier supporting devices; and (b) after receiving Data from the application Buffer at the CP region, Data processing is performed for encryption, compression, etc. These data processing operations take some time when number of PDUs to be processed is high. This "w" factor may be useful because the electronic device (100) should have the data ready, due to the high throughput (e.g., network resource (grant) allocation is high), so that the UL Resource allocation (grant) does not go waste due to padding performed based on the unavailability of processed data (compressed, secured, etc.).

In embodiments, the method may be used for PDU formation rate (PFR) to according to scheduling for T time-unit using equation (5). If the CP (120) has X amount of data and forms up to Y PDUs where Y is less than or equal to X. The PFR may be derived using a quality of service (QoS) parameter, uplink resource (UL Grant) allocation, network condition, etc.

$$PFR = IPFR \times \frac{\text{GRANT\_RATE}}{X} \times \frac{100 - PER\ \%}{100} \tag{5}$$

Where, an Initial PFR (IPFR) may be a maximum, or highest, of Prioritized Bit Rate (PBR) and/or Guaranteed/Aggregate Maximum Bit Rate (GBR/AMBR). GRANT_RATE may be computed based on a latest network resource allocation over a period. And, a PDU Error rate (PER) may be the packet loss over the air. The method may derive the initial PFR for a DRB based on latest known information like:

1) PFR of other active DRB multiplied by factor;
2) Weighted IPFR average of all active DRBs; and
3) A populated table for IPFR.

Further, PDU formation and PFR computation may also be based on multiple factors like: 1) Formed PDU count is less than a threshold; 2) frequent handover; 3) UL packet discards, etc.

FIG. 5 illustrates the arrangement and management of the CP buffer region. Memory reserved for the CP Buffer is divided into two sub regions namely the new PDU Region and the Retx Buffer Region. These are all free regions, initially. In the example considered below, for the sake of simplicity, each CP Buffer Storage location size and application data size is not being discussed. In practical implementations, individual AP data sizes could be different and individual CP storage buffer locations may be of different sizes. In FIG. 5, the left portion depicts a memory table of 120 CP Buffer storage locations from 1 to 120. Here, 100 CP storage locations are designated as the New PDU region and the remaining 20 are the Retx Buffer region. Initially, all are free regions.

At Time 0, data 1 to data 100 are brought to the CP region from the AP buffer via the interface manager (160). The Interface Manager may update the read index accordingly into the Shared memory region (as shown in FIG. 4).

At Time T='t', prior to bringing in fresh Buffer (data 101 to data 200) from the AP buffer region, data 1 to data 100 is flushed out except data 4 and data 6. Data 4 and data 6 due to the likelihood that this data will be in RLC level retransmission based on the potential that the data corresponds to a HARQ level NACK. Accordingly, data 4 and data 6 occupy 2 CP storage locations out of 20 reserved for the RETX Buffer region. Data 101 to data 200 are brought into the CP region and stored at 100 storage locations reserved for the New PDU region. Overall 18 Buffer regions are still free.

The top of the FIG. 5 shows the RLC protocol level state variable information where retransmission of data 1 to data 100 using RLC SN 1 to 100 has been attempted and without RLC ACK reception, these buffer have been flushed out of the CP region. Accordingly, data 101 to data 200 is occupying those locations (with the exception of for data 4 and data 6) at time T.

Further, FIG. 5 illustrates that RLC is to transmit data 150 next when the RLC status report is received with ACK SN 106 and NACK SN 7 at time T. As handling of this RLC status report, Data 101 to Data 105 is freed from the CP buffer region. Since data 1 to data 100 is already flushed out of the CP region, there is no data to free from the CP region. Data 4 and data 6 is also acknowledged with this status report. Accordingly, data 4 and data 6 will be freed from respective CP storage locations. The RLC status report includes a NACK corresponding to data 7 (with NACK SN 7) which is brought from the AP buffer region using the AP buffer pointer as stored in the CP descriptor information. Therefore, the right portion of FIG. 5 depicts the memory table where CP storage location for data 101 to 105, data 4 and data 6 is freed, and data 7 is brought from the AP region and stored at one of the free spaces. In this way, the CP region memory may be managed across time.

Conventional devices for performing offline PDU formation (e.g., advanced PDU formation (APF)) either use a Communication Processor to re-cipher data at each Handover (HO) or Cell Change, resulting in excessive consumption of security overhead resources (e.g., processor, power, delay, etc.), or store plain and ciphered (e.g., duplicate) copies of stored data resulting in excessive data storage in a Communication Processor buffer and causing higher memory costs and/or lower throughput due to dropped packets.

However, embodiments describe improved methods and devices for performing APF in which a determined fraction of application data is stored in the Communication Processor buffer and a determined amount of the application data is ciphered based on the determined fraction. Accordingly, the improved methods and devices perform APF without storing duplicate copies of the entire application data in the Communication Processor buffer, and/or without re-ciphering the application data. Thus, the improved methods and devices reduce consumption of security overhead resources (e.g., processor, power, delay, etc.), and/or reduce memory costs and improving throughout by reducing the amount of data stored in the Communication Processor buffer.

Embodiments disclosed herein may be implemented through at least one software program running on at least one hardware device and performing network management functions to control the elements.

According to embodiments, operations described herein as being performed by the electronic device (100), the AP (110), the CP (120), the communicator (130), the application (150), the application data determination controller (120a), the PFR determination controller (120b) and/or the interface manager (160) may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed concurrently, simultaneously or contemporaneously, or in some cases be performed in reverse order. In embodiments, one or more functions or operations illustrated as being performed in a flowchart, flow diagram, etc. may be omitted.

The foregoing description of embodiments will so fully reveal the general nature of embodiments herein that others may, by applying current knowledge, readily modify and/or adapt for various applications such embodiments without departing from the generic concept, and, therefore, such adaptations and modifications should and are intended to be comprehended within the meaning and range of equivalents of embodiments. It is to be understood that the phraseology or terminology employed herein is for the purpose of description and not of limitation. Therefore, while embodiments herein have been described in terms of examples, those skilled in the art will recognize that embodiments herein may be practiced with modification within the spirit and scope of embodiments as described herein.

We claim:

1. A method for data buffer memory management of an electronic device in a wireless network, comprising:
    storing, by processing circuitry, application data in an Application Processor (AP) buffer memory of the electronic device;
    determining, by the processing circuitry, a fraction of the application data from among the application data stored at the AP buffer memory based on at least one of a data rate capability of the electronic device, a data acknowledgment time or a tolerance time, the data rate capability indicating a maximum data rate of the electronic device or information used to estimate the maximum data rate, the data acknowledgement time being a first amount of time corresponding to receipt of a first acknowledgment in response to a corresponding Protocol Data Unit (PDU), and the tolerance time being a second amount of time corresponding to a duration in which a Communication Processor (CP) buffer memory would exhaust an available capacity absent receipt of a second acknowledgement;
    storing, by the processing circuitry, the fraction of the application data in the CP buffer memory of the electronic device;
    performing, by the processing circuitry, offline PDU formation including forming at least one PDU before a scheduled transmission opportunity, the at least one PDU being based on the fraction of the application data stored in the CP buffer memory; and
    transmitting, by the processing circuitry, at least one packet including the at least one PDU in the wireless network at the scheduled transmission opportunity.

2. The method as claimed in claim 1, further comprising:
    determining, by the processing circuitry, a PDU formation rate (PFR) based on a plurality of parameters;
    determining, by the processing circuitry, an amount of the application data to be ciphered from among the fraction of the application data stored at the CP buffer memory based on the PFR; and
    forming, by the processing circuitry, the at least one PDU for transmission by ciphering the amount of the application data.

3. The method as claimed in claim 2, wherein the plurality of parameters comprise at least one of an Initial PFR (IPFR), a grant rate, a PDU Error Rate (PER), a Quality of Service (QOS) parameter, or a condition of the wireless network.

4. The method as claimed in claim 3, wherein the IPFR is computed for a Data Radio Bearer (DRB) based on at least one of another PFR of another active DRB multiplied by a factor, a weighted IPFR average of all active DRBs, or a populated table for the IPFR.

5. The method as claimed in claim 3, wherein the grant rate is computed based on a latest network resource allocation over a period of time.

6. The method as claimed in claim 1, further comprising:
    determining, by the processing circuitry, whether at least one acknowledgement is received for the at least one packet from the wireless network; and
    performing, by the processing circuitry, one of
        replacing the fraction of the application data stored at the CP buffer memory with a new fraction of the application data in response to determining that the at least one acknowledgement is received, or
        computing a subset of the application data from among the fraction of the application data stored at the CP buffer memory in response to determining a failure to receive the at least one acknowledgement, and storing the subset of the application data in a retransmission buffer memory.

7. The method of claim in claim 6, wherein the computing the subset of the application data computes the subset of the application data based on at least one of a Medium Access Control (MAC) Hybrid Automatic Repeat Request (HARQ) error, a HARQ residual error or a previous Radio Link Control (RLC) Automatic Repeat Request (ARQ) error.

8. The method of claim in claim 6, wherein the retransmission buffer memory is located in the CP buffer memory.

9. The method as claimed in claim 2, further comprising:
    detecting, by the processing circuitry, at least one of a first condition in which a count of formed PDUs meets an advanced packet formation (APF) threshold, a second condition in which a frequency of handovers meets a frequency handover threshold, or a third condition in which a number of packet discards meets an Uplink (UL) packet discard threshold; and
    repeating, by the processing circuitry, the determining the PFR based on the at least one of the first condition, the second condition or the third condition.

10. An electronic device for data buffer memory management in a wireless network, comprising:
    an Application Processor (AP) buffer memory;
    a Communication Processor (CP) buffer memory; and
    processing circuitry configured to
        store application data at the AP buffer memory,
        determine a fraction of the application data from among the application data stored at the AP buffer memory based on at least one of a data rate capability of the electronic device, a data acknowledgment time or a tolerance time, the data rate capability indicating a maximum data rate of the electronic device or information used to estimate the maximum data rate, the data acknowledgement time being a first amount of time corresponding to receipt of a first acknowledgment in response to a corresponding Protocol Data Unit (PDU), and the tolerance time being a second amount of time corresponding to a duration in which a Communication Processor (CP) buffer memory would exhaust an available capacity absent receipt of a second acknowledgement, store the fraction of the application data in the CP buffer memory, perform offline PDU formation including forming at least one PDU before a scheduled transmission opportunity, the at least one PDU being based on the fraction of the application data stored in the CP buffer memory, and transmit at least one packet including the at least one PDU in the wireless network at the scheduled transmission opportunity.

11. The electronic device as claimed in claim 10, wherein the processing circuitry is configured to:

determine a PDU formation rate (PFR) based on a plurality of parameters;

determine an amount of the application data to be ciphered from among the fraction of the application data stored at the CP buffer memory based on the PFR; and form the at least one PDU for transmission by ciphering the amount of the application data.

12. The electronic device as claimed in claim 11, wherein the plurality of parameters comprises at least one of an Initial PFR (IPFR), a grant rate, a PDU Error Rate (PER), a Quality of Service (QOS) parameter, or a condition of the wireless network.

13. The electronic device as claimed in claim 12, wherein the IPFR is computed for a data Radio Bearer (DRB) based on at least one of another PFR of another active DRB multiplied by a factor, a weighted IPFR average of all active DRBs, or a populated table for the IPFR.

14. The electronic device as claimed in claim 12, wherein the grant rate is computed based on a latest network resource allocation over a period of time.

15. The electronic device as claimed in claim 10, wherein the electronic device further comprises a retransmission buffer memory; and the processing circuitry is configured to determine whether at least one acknowledgement is received for the at least one packet from the wireless network; and perform one of replacing the fraction of the application data stored at the CP buffer memory with a new fraction of the application data in response to determining that the at least one acknowledgement is received, and computing a subset of the application data from among the fraction of the application data stored at the CP buffer memory in response to determining a failure to receive the at least one acknowledgement, and storing the subset of the application data in a retransmission buffer memory.

16. The electronic device as claimed in claim 15, wherein processing circuitry is configured to compute the subset of the application data based on at least one of a Medium Access Control (MAC) Hybrid Automatic Repeat Request (HARQ) error, a HARQ residual error or a previous Radio Link Control (RLC) Automatic Repeat Request (ARQ) error.

17. The electronic device as claimed in claim 15, wherein the retransmission buffer memory is shared memory between the AP and the CP.

18. The electronic device as claimed in claim 11, wherein the processing circuitry is configured to:

detect at least one of a first condition in which a count of formed PDUs meets an advanced packet formation (APF) threshold, a second condition in which a frequency of handovers meets a frequency handover threshold, or a third condition in which a number of packet discards meets an Uplink (UL) packet discard threshold; and re-determine the PFR based on the at least one of the first condition, the second condition or the third condition.

19. A non-transitory computer-readable medium storing instructions that, when executed by processing circuitry, cause the processing circuitry to perform a method for data buffer memory management of an electronic device in a wireless network, the method comprising:

storing application data in an Application Processor (AP) buffer memory of the electronic device;

determining a fraction of the application data from among the application data stored at the AP buffer memory based on at least one of a data rate capability of the electronic device, a data acknowledgment time or a tolerance time, the data rate capability indicating a maximum data rate of the electronic device or information used to estimate the maximum data rate, the data acknowledgement time being a first amount of time corresponding to receipt of a first acknowledgment in response to a corresponding Protocol Data Unit (PDU), and the tolerance time being a second amount of time corresponding to a duration in which a Communication Processor (CP) buffer memory would exhaust an available capacity absent receipt of a second acknowledgement;

storing the fraction of the application data in the CP buffer memory of the electronic device;

performing offline PDU formation including forming at least one PDU before a scheduled transmission opportunity, the at least one PDU being based on the fraction of the application data stored in the CP buffer memory; and transmitting, by the processing circuitry, at least one packet including the at least one PDU in the wireless network at the scheduled transmission opportunity.

20. The non-transitory computer-readable medium as claimed in claim 19, wherein the method further comprises:

determining a PDU formation rate (PFR) based on a plurality of parameters;

determining an amount of the application data to be ciphered from among the fraction of the application data stored at the CP buffer memory based on the PFR; and forming the at least one PDU for transmission by ciphering the amount of the application data.

* * * * *